(12) United States Patent
Reed et al.

(10) Patent No.: US 11,358,013 B2
(45) Date of Patent: Jun. 14, 2022

(54) PATHOGEN-KILLING FILTER ASSEMBLAGE

(71) Applicant: KJR Materials Technology Consulting LLC, Rochester, NY (US)

(72) Inventors: Kenneth J. Reed, Rochester, NY (US); Shirley Reed, Rochester, NY (US)

(73) Assignee: KJR Materials Technology Consulting LLC, Rochester, NY (US)

( * ) Notice: Subject to any disclaimer, the term of this patent is extended or adjusted under 35 U.S.C. 154(b) by 0 days.

(21) Appl. No.: 17/232,081

(22) Filed: Apr. 15, 2021

(65) Prior Publication Data

US 2021/0322802 A1  Oct. 21, 2021

Related U.S. Application Data

(60) Provisional application No. 63/010,593, filed on Apr. 15, 2020.

(51) Int. Cl.
| | | |
|---|---|---|
| *A62B 23/02* | (2006.01) | |
| *A41D 13/11* | (2006.01) | |
| *A62D 9/00* | (2006.01) | |
| A62B 18/02 | (2006.01) | |
| B01D 46/00 | (2022.01) | |

(52) U.S. Cl.
CPC .............. *A62B 23/025* (2013.01); *A62D 9/00* (2013.01); *A41D 13/1192* (2013.01); *A62B 18/025* (2013.01); *B01D 46/0028* (2013.01); *B01D 2239/045* (2013.01); *B01D 2239/0442* (2013.01)

(58) Field of Classification Search
CPC ........ B01D 39/2027; B01D 2239/0442; B01D 2239/045; B01D 46/0028
See application file for complete search history.

(56) References Cited

U.S. PATENT DOCUMENTS

| | | | |
|---|---|---|---|
| 2003/0205137 A1* | 11/2003 | Bolduc | B01D 46/0028 95/285 |
| 2004/0163648 A1* | 8/2004 | Burton | A61M 16/0633 128/204.21 |
| 2008/0229929 A1* | 9/2008 | Marcoon | B01D 46/10 96/296 |
| 2008/0279253 A1* | 11/2008 | MacDonald | G01K 11/12 374/162 |
| 2008/0295843 A1* | 12/2008 | Haas | A41D 13/1192 128/205.27 |
| 2008/0313939 A1* | 12/2008 | Ardill | G09F 3/02 40/329 |
| 2012/0272967 A1* | 11/2012 | Stewart | A41D 13/1192 128/206.12 |

(Continued)

FOREIGN PATENT DOCUMENTS

WO    WO-2004016318 A1 *  2/2004   ......... A41D 13/1192

*Primary Examiner* — Bradley H Philips
*Assistant Examiner* — Savannah L Gabriel
(74) *Attorney, Agent, or Firm* — Tracy Jong Law Firm; Tracy P. Jong; Cheng Ning Jong

(57) ABSTRACT

A filter configured for capturing and killing pathogens, the filter including a first breathable layer including copper; and a second breathable layer including silver, the second breathable layer coupled to the first breathable layer, wherein the first breathable layer and the second breathable layer cooperate to capture and kill pathogens mobilized through at least one of the first breathable layer and the second breathable layer.

16 Claims, 14 Drawing Sheets

(56) References Cited

U.S. PATENT DOCUMENTS

| | | | |
|---|---|---|---|
| 2014/0227397 A1* | 8/2014 | Friedman | G01K 1/02 |
| | | | 426/62 |
| 2015/0343748 A1* | 12/2015 | Broyles | A61F 13/51401 |
| | | | 428/220 |
| 2016/0175752 A1* | 6/2016 | Jaganathan | A41D 13/11 |
| | | | 95/273 |
| 2016/0199674 A1* | 7/2016 | Johnson | A62B 18/02 |
| | | | 600/549 |
| 2016/0296871 A1* | 10/2016 | Scope | B01D 46/0028 |
| 2017/0106217 A1* | 4/2017 | Kuhn | A41D 13/1161 |
| 2018/0078798 A1* | 3/2018 | Fabian | A62B 7/10 |
| 2018/0106217 A1* | 4/2018 | Krishnan | F02K 9/343 |
| 2019/0125011 A1* | 5/2019 | Eisenbrey | G01K 11/12 |
| 2019/0321661 A1* | 10/2019 | Vanderham | A61M 16/0605 |
| 2021/0086005 A1* | 3/2021 | O'Brien | C08L 5/08 |
| 2021/0299485 A1* | 9/2021 | Cubon | A62B 18/025 |

* cited by examiner

PATHOGEN-KILLING FILTER ASSEMBLAGE

PRIORITY CLAIM AND RELATED APPLICATIONS

This non-provisional application claims the benefit of priority from provisional application U.S. Ser. No. 63/010,593 filed Apr. 15, 2020. Said application is incorporated by reference in its entirety.

BACKGROUND OF THE INVENTION

1. The Field of the Invention

This invention relates to devices for personal protection against pathogens such as bacteria and viruses. A reactive barrier assemblage is described for first immobilizing or restricting pathogen movement and then subsequently destroying the pathogen population near or on a human body. This protective assemblage can be contained in a device such as a face mask, glove, scarf, ventilator, respirator or open wound covering and can be cleaned and reused. This invention further relates to temperature sensing and displaying face masks for personal protection against allergens and pathogens such as bacteria and viruses. This mask is a sentinel mask in that it informs individuals in the vicinity of the mask wearer as to the temperature state of health (normal or high) of the mask wearer. If warranted, appropriate further care-giving to the mask wearer can immediately be determined without recourse to an invasive sublingual thermometer or infrared forehead reading.

2. Background Art

The current and tragic novel coronavirus COVID-19 pandemic has brought into sharp and painful focus, the multiple and severe limitations of current face mask technology, e.g., N95 masks, now used in the front line of defense as a component of personal protection equipment.

Foremost among the limitations of the existing mass-produced and widely-available devices is the fact that the pore size of the polymer material used to construct the mask is on the order of microns (microporous) whereas the virus is tiny, only tens of nanometers in size. COVID-19 is thought to be on the order of 80-120 nm. Thus, the pathogen trapping efficiency is low unless the mask layer is thick enough to impede viral penetration. Even bacteria which can be several microns in size may not be efficiently trapped.

Equally limiting is the fact that the virus or bacterium lives for several hours or longer in the mask which may be in close proximity to the human face (or a close-by individual), since the virus is not necessarily immobilized in the mask material, nor is it killed or rendered harmless. So, it is unclear who, if anyone, is protected; the wearer (upon inhalation) or nearby individuals (upon exhalation). The still active and living pathogens may reside on the surfaces and then be subject to potential spread as the mask is handled or comes into contact with other surfaces. Take for example, typical and predictable use such as a mask taken off by the wearer and set down for a temporary period before being re-applied (while eating or showering, or after leaving a public place and driving home as few examples).

Additionally, the fact that current disposable masks are essentially single-use, puts a tremendous strain on the logistics system to make an enormous mask supply both universally available and persistent, i.e., available over long periods of time. Since many masks are identically-looking; yet another limitation, there is no way of knowing who has used the mask and when it was used. Further, unclaimed masks present a problem for their disposal as it is not known whether they are contaminated.

With a virus such as COVID-19 in which greater than 85% of the affected individuals are asymptomatic and is extent everywhere (whence the name pandemic), extensive population testing for the disease is not going to be terribly productive or easy to effectively implement on a wide scale and long term basis.

Clearly, full-scale protection of the population in an everyday normal living environment is the most desirable option for addressing public health issues-one not provided by rapid, e.g., in under two hours, virus destruction, current face mask technology and its shortcomings. Thus, there is substantial room for vastly improved personal protection equipment, for the population in general not only for airborne pathogens but also for tactile modes of protection from contaminated surfaces. There is further substantial room for vastly improved personal protection equipment for the population where the pathogens are immobilized and killed instead of simply being redirected for a possible delayed transmission. Real time temperature monitoring and visualization among the mask wearer population provides an early detection or sentinel system to continually monitor in real time an individual's temperature state and provide an early warning of possible fever and infection while helping nearby individuals monitor the health state of their near neighbors.

SUMMARY OF THE INVENTION

In accordance with the present invention, there is provided a filter configured for capturing and killing pathogens, the filter including:
  (a) a first breathable layer including copper; and
  (b) a second breathable layer including silver, the second breathable layer coupled to the first breathable layer,
  wherein the first breathable layer and the second breathable layer cooperate to capture and kill pathogens mobilized through at least one of the first breathable layer and the second breathable layer.

In one embodiment, at least one of the first breathable layer and a second breathable layer includes a matrix selected from the group consisting of a wire mesh, an expanded pad, a printed pad and an aerogel matrix. In one embodiment, the thickness of each of the breathable layers is less than about 0.3 mm. In one embodiment, at least one of the first breathable layer and the second breathable layer is a flat layer. In one embodiment, at least one of the first breathable layer and the second breathable layer is a pleated layer. In one embodiment, the filter is a filter configured for a personalized protection equipment, a face mask, a glove, a scarf, a bandage for covering and protecting an open wound, a portable wearable ventilator system, a respirator, a furnace filter or an air conditioning filter.

In accordance with the present invention, there is further provided a face mask for a user having a face, a nose and a mouth, the face mask including a filter including:
  (i) a first breathable layer including copper; and
  (ii) a second breathable layer including silver, the second breathable layer coupled to the first breathable layer,
  wherein the filter is configured to cover at least a portion of the nose of the user and at least a portion of the mouth of the user;

wherein when the filter is disposed over the nose and the mouth of the user, at least a portion of the inhalation and exhalation through the nose or the mouth of the user through the first breathable layer and the second breathable and the first breathable layer and the second breathable layer cooperate to capture and kill pathogens mobilized through at least one of the first breathable layer and the second breathable layer due to the at least a portion of the inhalation and the exhalation.

In one embodiment, the filter further includes a third breathable layer including silver, wherein the third breathable layer is coupled with the first breathable layer and the second breathable layer such that the first breathable layer is disposed between the second breathable layer and the third breathable layer. In one embodiment, the filter further includes a fourth breathable layer disposed between and coupled to the third breathable layer and the first breathable layer, wherein the fourth layer includes an anti-allergen polymer screen. In one embodiment, the third breathable layer includes cotton cloth. In one embodiment, the anti-allergen polymer screen includes pore sizes greater than or equal to about 300 nm. In one embodiment, the filter further includes a third breathable layer, wherein the third breathable layer is disposed in a manner such that the second breathable layer is disposed between the first breathable layer and the third breathable layer. In one embodiment, the face mask further includes a temperature sensor configured for obtaining and displaying a temperature of the user, the temperature sensor including a sensing element and an output display. In one embodiment, the face mask further includes a temperature sensor configured for obtaining and displaying a temperature of the user, the temperature sensor including a sensing element thermally connected to the first breathable layer. In one embodiment, the sensing element is a thermistor. In one embodiment, the output display is a Liquid Crystal Display (LCD). In one embodiment, the output display is a Light Emitting Diode (LED) display. In one embodiment, the output display is a reflective display. In one embodiment, the output display is a light absorptive display. In one embodiment, the output display is a thermochromic polymer responsive and representative of the range of at least about 97 to about 102 degrees F. In one embodiment, the temperature sensor includes a phase change material, wherein if the phase change material is disposed at a temperature indicating the user is unwell, the phase change material is disposed in a transparent state, revealing an indicator indicating that the user is unwell. In one embodiment, the first breathable layer includes a matrix material including a copper alloy. In one embodiment, the face mask further includes at least one identifying label including a name tag, a date of first use and an intended date of final use. In one embodiment, the at least one identifying label is marked using copper phthalocyanine which is also antimicrobial. In one embodiment, the second breathable layer includes a material selected from the group consisting of a silver antimicrobial salt, a silver sewn threaded matrix, a silver printed matrix and any combinations thereof.

It is an object of this invention to efficiently trap and quickly kill pathogenic agents, e.g., in minutes not hours, both bacteria and viruses, for not only the wearer of this protective barrier but also to provide additional protection to nearby individuals.

It is another object of this invention to provide a personalized, durable, reusable and cleanable item, e.g., a face mask, that may be infrequently replaced (weekly, bi-weekly or monthly), thereby facilitating its long-term use. In addition to providing continual, long-term, e.g., diurnal protection, as the present mask is reusable, the use of the present mask greatly reduces the stress on the mask logistical supply and disposal chain, thereby promoting widespread availability and less adverse environmental impact. The mask's reusable feature and ease of cleaning greatly reduces the long-term financial cost to the user and problems associated with the disposal of contaminated masks.

These objectives are achieved by employing a multilayer assemblage that substantially immobilizes and subsequently kills human pathogens. This assemblage includes two or more layers. In one embodiment, an outermost layer of soft breathable material of a present mask is imbibed with silver antimicrobial salts or silver sewn threads and effectively kills bacteria (that are on the order of several microns in diameter).

It is yet another object of this invention to provide a visible on-mask temperature monitoring and display system that can immediately alert a passerby of the temperature state of the mask wearer in both a rapid and continuous manner. The temperature sensing or displaying feature provides a state of health awareness of the wearer and is further motivation for either the wearer and/or the general population to use and wear the mask.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—multicomponent or multilayer assemblage or filter
4—first breathable layer
6—second breathable layer
8—third breathable layer
10—fourth breathable layer
12—marking
14—face mask
16—bandage
18—adhesive
20—glove
22—general direction in which pathogen enters multicomponent assemblage
24—general direction in which pathogen enters multicomponent assemblage
26—user
28—ventilator
30—ear loop
32—nose
34—mouth
36—border
38—temperature sensor
40—temperature sensing element
42—control device
44—output device
46—temperature sensing phase change material
48—thermochromic material, e.g., thermochromic dye
50—column indicating user body temperature
52—column indicating a color representing normal body temperature and a color representing abnormal body temperature
54—color representing normal body temperature
56—color representing abnormal body temperature
58—wire
60—identifying tag

PARTICULAR ADVANTAGES OF THE INVENTION

An advantage is that the mask construction and material composition, especially the pure copper metal or copper alloy layer is mechanically robust and reusable over extended periods of time, e.g., months, as it can be readily cleaned by a variety of simple measures, e.g., using isopropyl alcohol wipe, gentle hand washing and UV exposure, etc. The economic cost and logistical advantages of a single reusable mask can be quite large thereby providing affordable available protection for a large fraction the population in general. Finally, the multicomponent assemblage may be advantageously employed in other configuration such as a component of a portable ventilator system, a glove, a covering for an open wound and a respirator or even in a residential public or heating ventilating and cooling (HVAC) situation.

Another advantage is that both the mask wearer and those near the wearer are provided protection from various pathogens. This factor provides significant motivation for the mask wearer as his or her actions greatly benefit themselves individually and not just the adjacent community in general. This particular motivational feature to wear the mask is greatly enhanced by the temperature sensing and reporting mask capabilities as the wearer now has other individuals actively engaged in monitoring his/her temperature state of health continuously and in real time.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
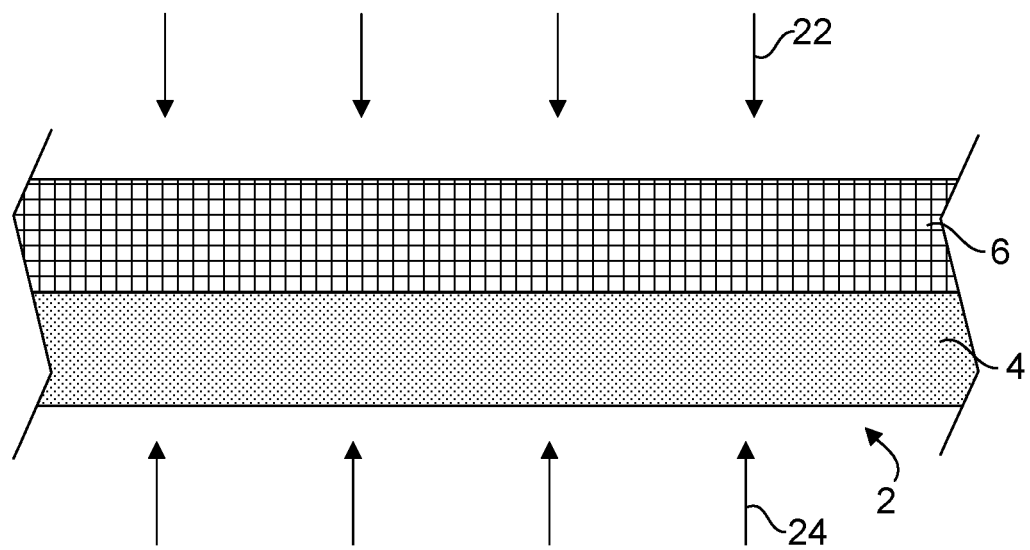
FIG. 1 is a diagram depicting one embodiment of a multicomponent assemblage.

FIG. 1 is a diagram depicting one embodiment of a multicomponent assemblage. Shown in FIG. 1 is a partial cross-sectional view of a two-layer assemblage constituting one embodiment of the multilayer assemblage. Each layer has a specific function (antimicrobial or viricidal) and when used in combination, there are synergistic advantages and each is breathable, i.e., capable of letting air from either side of a layer through. The filter 2 includes a first breathable layer 4 including copper; and a second breathable layer 6 including silver. In one embodiment, the second breathable layer 6 is coupled to the first breathable layer 4 by securing only their peripheries with techniques, e.g., gluing, stitching, etc., which immobilizes their peripheries only without affecting the breathable properties of the layers. Care must be taken to avoid using a coupling technique that significantly alters the breathability through the layers. For instance, if gluing is used, it must not significantly increase the area it covers to avoid portions of the filter that become impermeable to air. The first layer includes copper or copper alloy (e.g., brass, bronze, etc.) particles imbibed, supported or coated on a sponge or aerosol matrix of a mesh size of <500 (19 microns) for trapping and killing viruses of size in the order of about 100 nm. In another embodiment, the first breathable layer is not a metal-infused fabric but rather a mesh of woven strands or threads constructed from copper or copper alloy. Copper is a bactericide and is a universal virucide. The second layer includes silver particles imbibed, supported or coated on a sponge, aerosol matrix of a mesh and tulle, etc. Silver is a bactericide with only limited efficacy against viruses and furthermore it requires moisture to be an effective antimicrobial. Moisture from a mask wearer's breath provides a medium that makes the silver imbibed layer effective as an antimicrobial. The silver particles can include silver antimicrobial salts or silver sewn threads. Exposure of bacteria on the order of several microns in diameter, to a silver particle effectively kills it. Therefore, the first breathable layer and the second breathable layer cooperate to capture and kill pathogens, e.g., viruses and bacteria mobilized through at least one of the first breathable layer and the second breathable layer. As both copper and silver are bactericide and virucide to varying degrees, the two metals or their alloys together complement one another to kill a large percentage of all viruses or bacteria mobilized through the combined first and second breathable layers. Thus, both bacteria and viruses are killed and are not residual in/on the filter and available for delayed dispersal. As such, there are risks of distributing potent viruses and bacteria once they are caught in the layers. Since only metals are used on the pathogen-killing filter, there are no volatile chemicals providing this function as in previous inventions (GlaxoSmithKline Acti Protect®, and Universal and reusable virus deactivation system for respiratory protection Fu-Shi Quan, Ilaria Rubino, Su-Hwa Lee, Brendan Koch& Hyo-Jick Choi Scientific Reports|7:39956|DOI: 10.1038/ srep3995). Thus, there is no residual or harmful smell inhaled by the user. FIG. 1 discloses a filter suitable for a low potential for exposure to viruses and bacteria. However, if the potential for exposure to viruses and bacteria is higher, e.g., an area where there are known transmissions of such pathogens, a more protective filter, e.g., one shown in FIG. 2, may be desired. Virus destruction is greatly facilitated at elevated temperatures. As an additional breathable layer, e.g., a second breathable layer 6 is disposed on the outer surface of the first breathable layer 4, the user's body heat, e.g., from the moist warm breath of the user 26 is trapped on the first breathable layer, sufficiently increasing the temperature of the first breathable layer 4 to destroy viruses trapped in this layer. The effectiveness of silver as an antimicrobial is related to mobile interstitial Ag+ ions whose concentration is enhanced in moist environments. Furthermore, for every 10 degrees C. temperature increment, chemical reaction rates effectively double, thereby killing the pathogen twice as fast, i.e., half the lifetime of the mask. In one embodiment, at least one of the first breathable layer 4 and a second breathable layer 6 includes a matrix constructed from a wire mesh, an expanded pad, a printed pad, an aerogel matrix or any combinations thereof.

Figure 2:
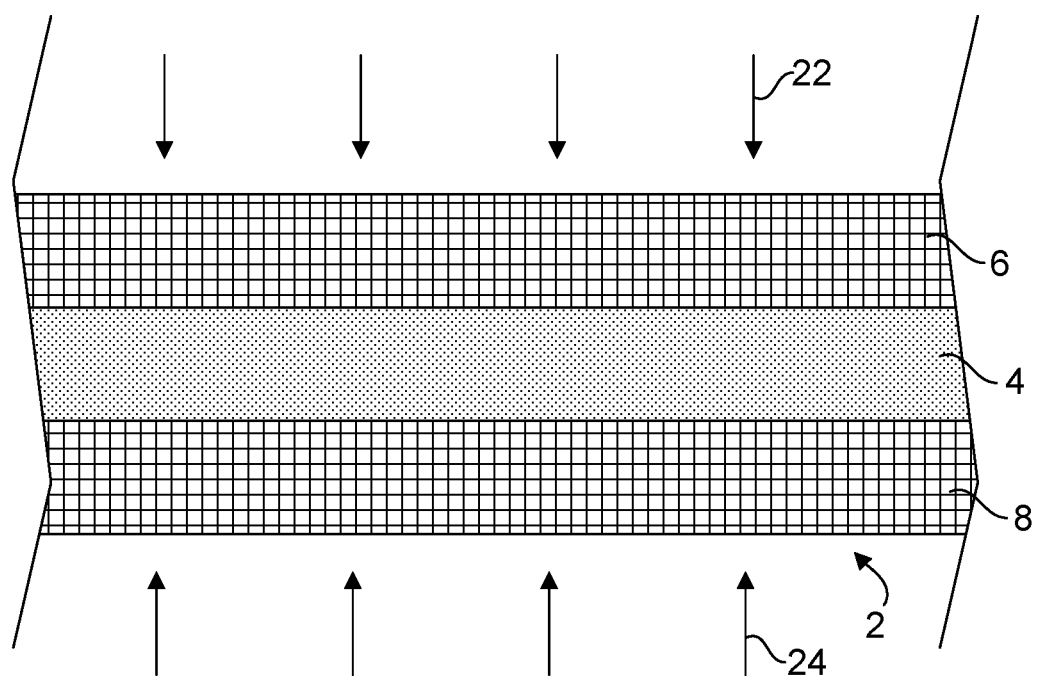
FIG. 2 is a diagram depicting another embodiment of a multicomponent assemblage.

FIG. 2 is a diagram depicting another embodiment of a multicomponent assemblage 2. It shall be noted that in this embodiment, a layer similar to the second breathable layer 6, i.e., the third breathable layer 8, is provided and coupled to the first breathable layer 4 such that the first breathable layer 4 is sandwiched between the first breathable layer 4 and the third breathable layer 8. This layer is preferably constructed from a material that is soft, comfortable and non-abrasive to the human skin if it comes in contact with a user's face. The material includes but not limited to natural or synthetic woven material, e.g., cloth or fabric constructed from silk, cotton, polyester, rayon, wool, etc. The additional third breathable layer provides for an additional layer of material to immobilize viruses and bacteria that managed to get through the first two breathable layers as it is also imbibed with a silver material, e.g., when the threads for weaving the breathable layer is silver or silver salts coated. Further, when disposed in this arrangement, the moist warm breath of the user 26 is more easily trapped in the layer closest to the user's skin, causing the moisture in the breath to activate the silver component against viruses and bacteria trapped in this layer.

Figure 3:
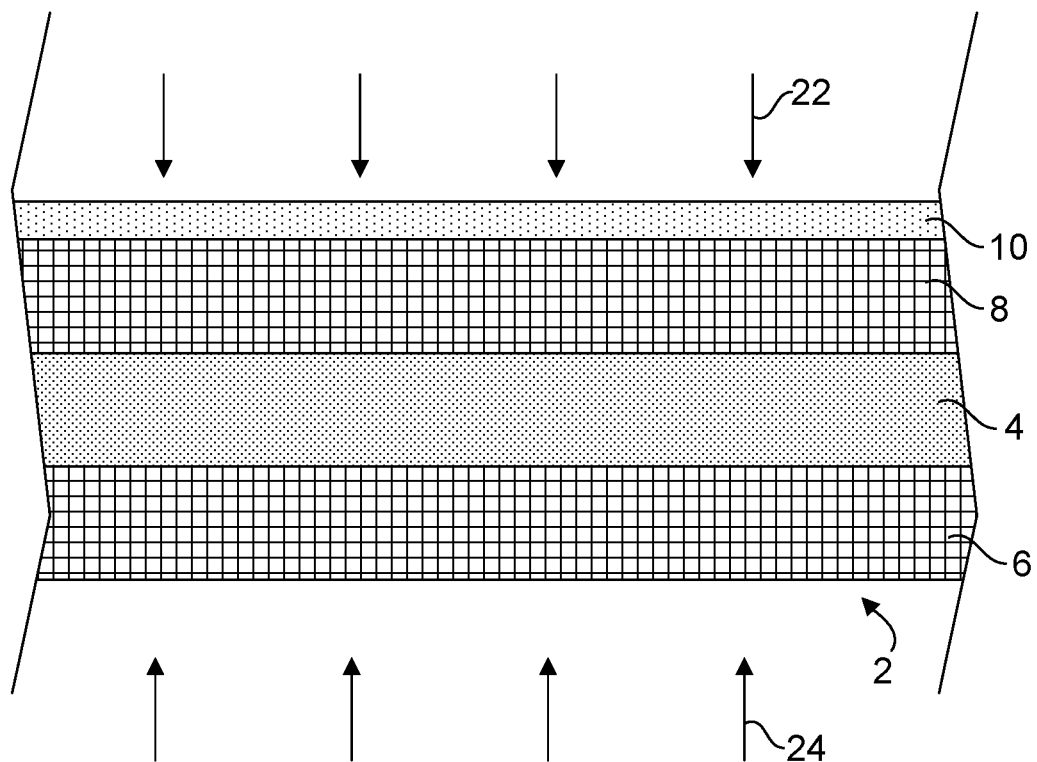
FIG. 3 is a diagram depicting yet another embodiment of a multicomponent assemblage.
Figure 4:
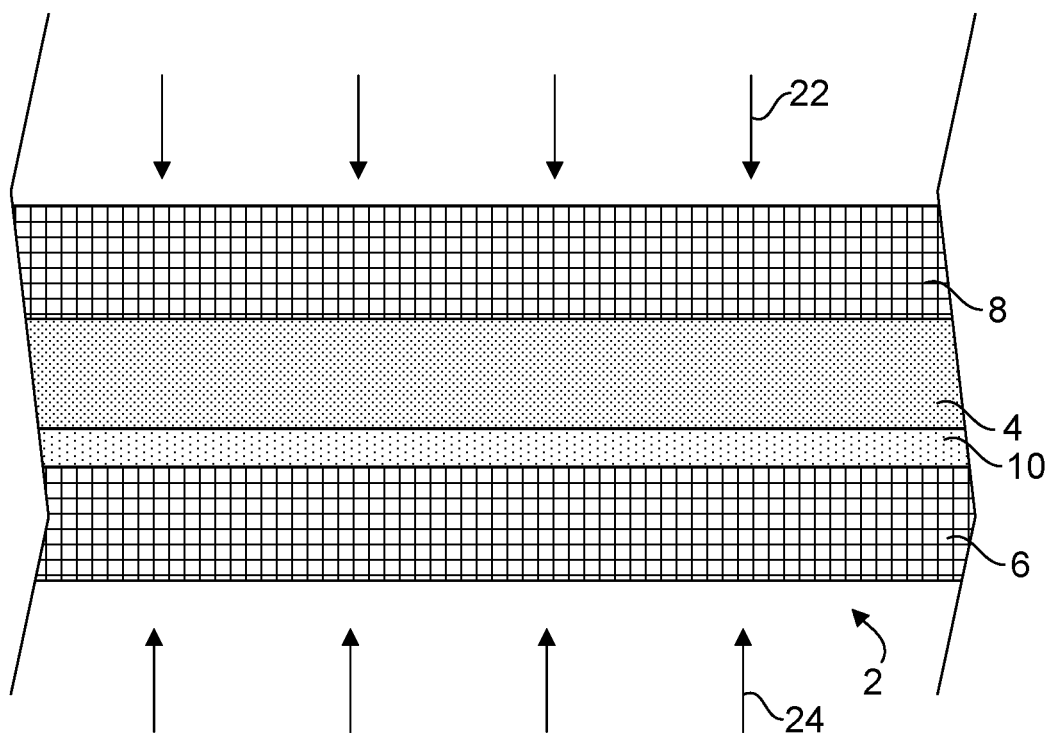
FIG. 4 is a diagram depicting yet another embodiment of a multicomponent assemblage.

FIG. 3 is a diagram depicting yet another embodiment of a multicomponent assemblage 2. FIG. 4 is a diagram depicting yet another embodiment of a multicomponent assemblage 2. FIGS. 3 and 4 depict two examples where an anti-allergen breathable layer may be combined with the silver and copper imbibed layers to further provide defenses against airborne allergen, e.g., animal dander, dust mites, pollen and mold, etc. An example of such a layer is commercially marketed as AllergyGuard® mesh supplied by BMT Commodity Corp. It shall be noted that for ease of cleaning the filter 2, the anti-allergen breathable layer 10 is preferably disposed on the outermost surface of the combined layers as shown in FIG. 3. The anti-allergen breathable layer 10 can be disposed between other layers, e.g., between a copper-imbibed layer and a silver-imbibed layer as shown in FIG. 4 to take advantage of the filtering capabilities with other layers when combined with those other layers.

One of the benefits of combining two or more breathable layers lies in their ability to cooperate with one another, a benefit that cannot be realized if each of the layers is used separately. For instance, even if each breathable layer only blocks 80%, or a layer that is considered moderately porous, of all the pathogens and allergen, i.e., each layer transmits 20%, two breathable layers will pass 0.2×0.2 or 4 parts per million (ppm). By the same token, three breathable layers will pass 8 parts per billion (ppb) and four layers will pass 16 parts per trillion (ppt) of the harmful pathogens and allergen. As the pathogen transmittance efficiency of each breathable layer increases for example to 30% or even 40%, then the pathogen transmission efficiency increases to 0.81% (or 99.19% blocking) and to 2.56% (or 97.46% blocking), respectively. These calculations reveal that the multilayer mask provides a robust pathogen or pathogen and allergen defense so that even if one breathable layer is torn or ripped or otherwise compromised to become more pathogen transmissive, the filter still affords much greater protection than other masks, e.g., N95 masks. Additionally, these layers are hydrophobic and will not transmit water borne pathogens or blood or blood components to the wearer's face. Another advantage of combining two or more breathable layers lies in their ability to cooperate with one another to capture pathogens and allergens. Even though the pore size of each breathable layer is large, e.g., about 75 microns for the copper imbibed layer of screen of about mesh size 200 (relative to a bacteria size of about 2 microns or a virus size of about 0.1 micron), none of these breathable layers are in registration, i.e., the pores of these layers do not align with one another. Therefore, the effective transmission paths or "holes" for the viruses and bacteria to travel unimpeded can be vanishingly small. Mask movement and off-normal incidence of the contaminated air stream (with respect to holes) further reduce the pathogen's available, straight through path to the user. In FIGS. 1-4, the breathable layers are shown to come in contact with one another. However, they do not need to be arranged in this manner although disposing them in this manner makes the filter 2 more compact and less bulky to handle. In one embodiment, each of the breathable layers preferably measures no more than about 0.3 mm thick. In one embodiment, any one of the breathable layers can be a flat layer, i.e., not pleated. A flat layer makes cleaning easier as allergen and pathogens and other unwanted materials can be rinsed out more easily. In another embodiment, any one of the breathable layers can be a pleated layer for further increasing the ability for the layer to capture pathogens or allergen.

Figure 5:
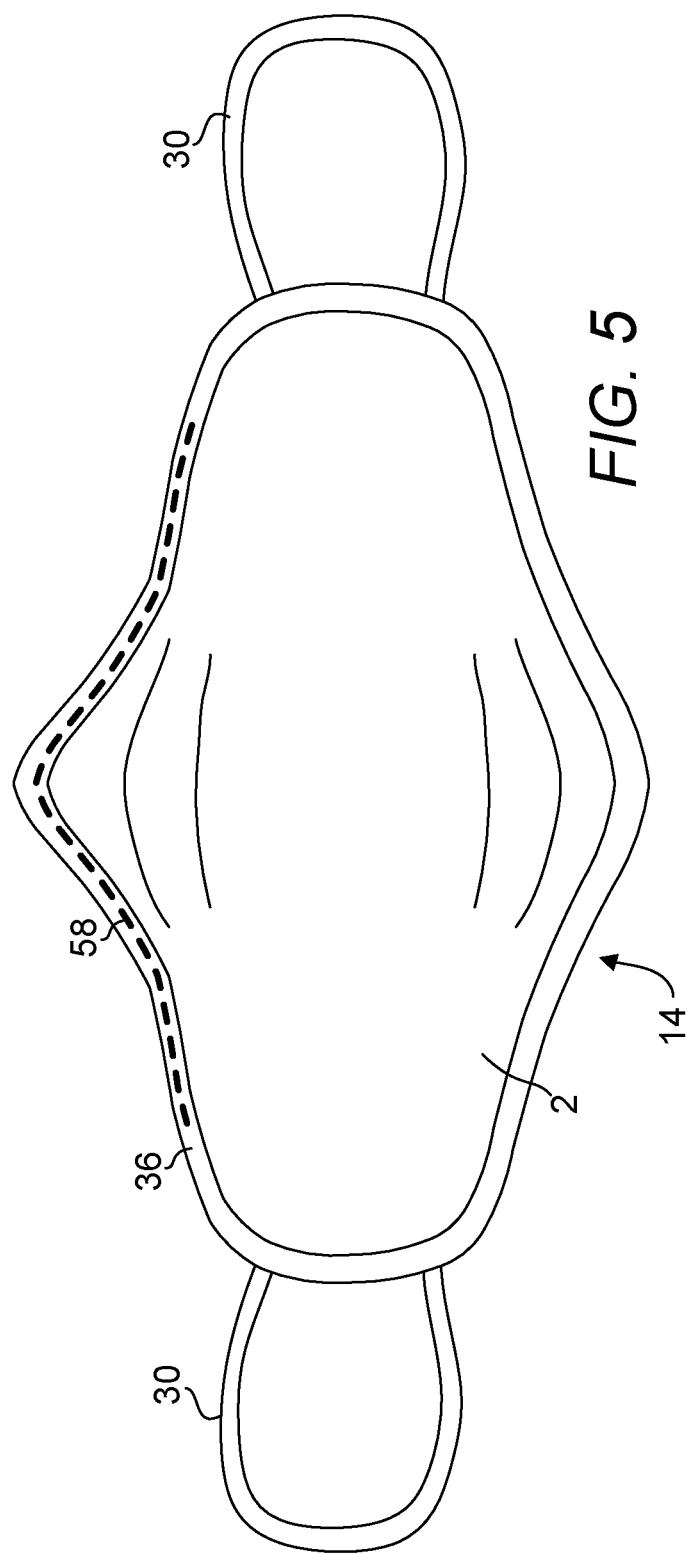
FIG. 5 is a front view of a present face mask including a multicomponent assemblage.
Figure 6:
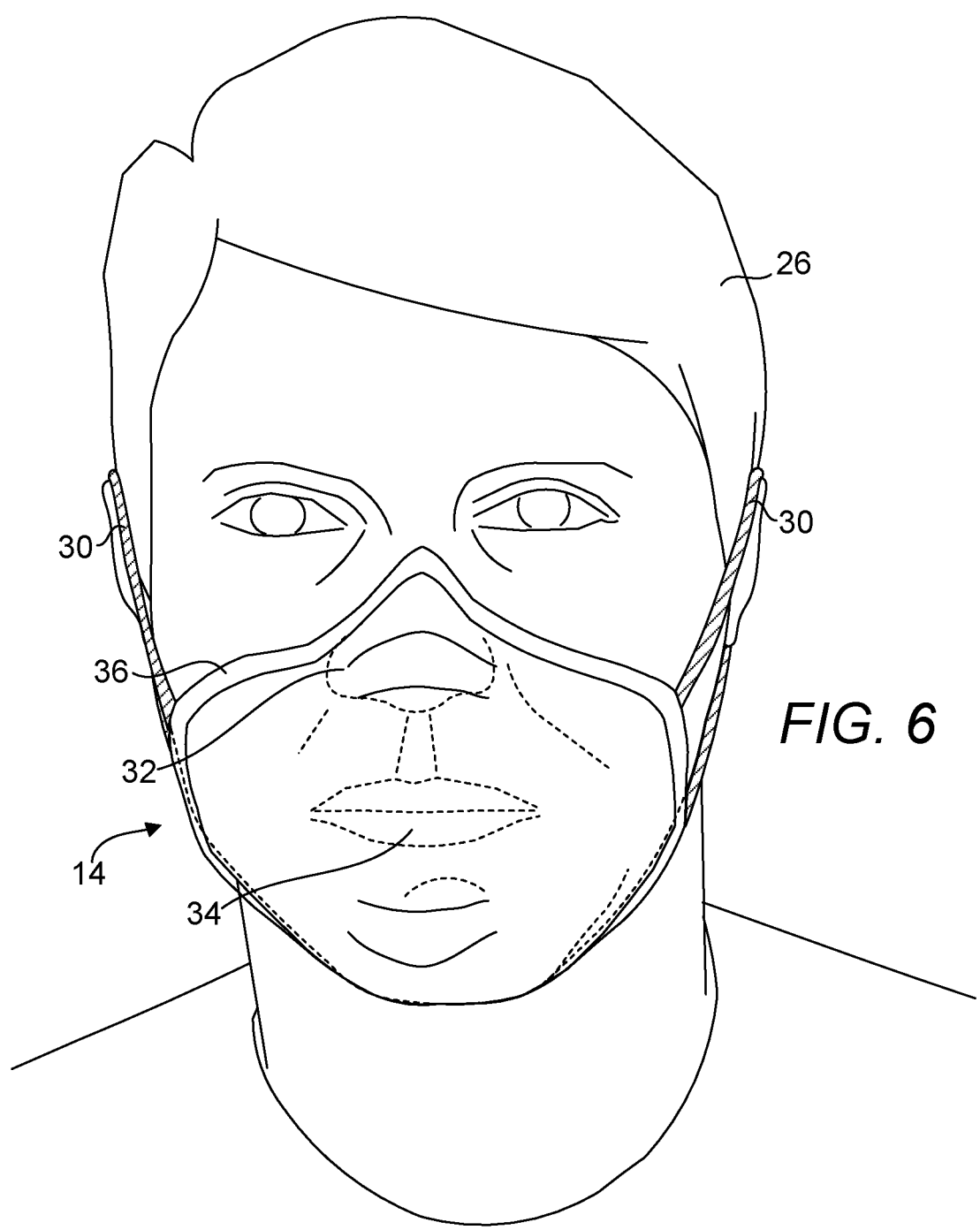
FIG. 6 is a partially transparent front view of a present face mask including a multicomponent assemblage, revealing the protection of parts of the respiratory system of a user.

FIG. 5 is a front view of a present face mask including a multicomponent assemblage. FIG. 6 is a partially transparent front view of a present face mask including a multicomponent assemblage, revealing the protection of parts of the respiratory system of a user. The multilayer assemblage 2 may be applied to the entire mask or the frontal portion of the mask that pathogens will most likely come in contact with. Pathogens drawn externally to the mask 14, e.g., by way of inhalation of the user, in direction 22, are trapped and killed in the multilayer assemblage 2 while pathogens expelled by the user, e.g., by way of exhalation of the user, in direction 24, are also trapped and killed in the multilayer assemblage 2. In the embodiment shown in FIG. 6, two ear loops 30, each disposed on one side of a face mask 14 to make the face mask 14 easier to be secured to the user's face, properly covering the user's nose 32 and mouth 34 such that air transmission between the space encompassed by the face mask 14 occurs at least largely through the filter 2. A border 36 configured to seal the edges of the filter 2 is provided to cover and protect the edges of the layers secured at their peripheries. Although face masks are used herein as usage examples for the multicomponent or multilayer assemblage, the same can be applied to any one of the other devices or objects including, but not limited to, scarfs, gloves, respirators and ventilators, etc. In order to provide an improved fit around the nose area of the face mask, a flexible copper or steel wire 58 running along at least an upper periphery of the face mask, is provided. This way, a user can press the periphery in this area to conform more readily to the contours of the nose and cheeks to result in a better fit of the face mask on the user's face.

Figure 7:
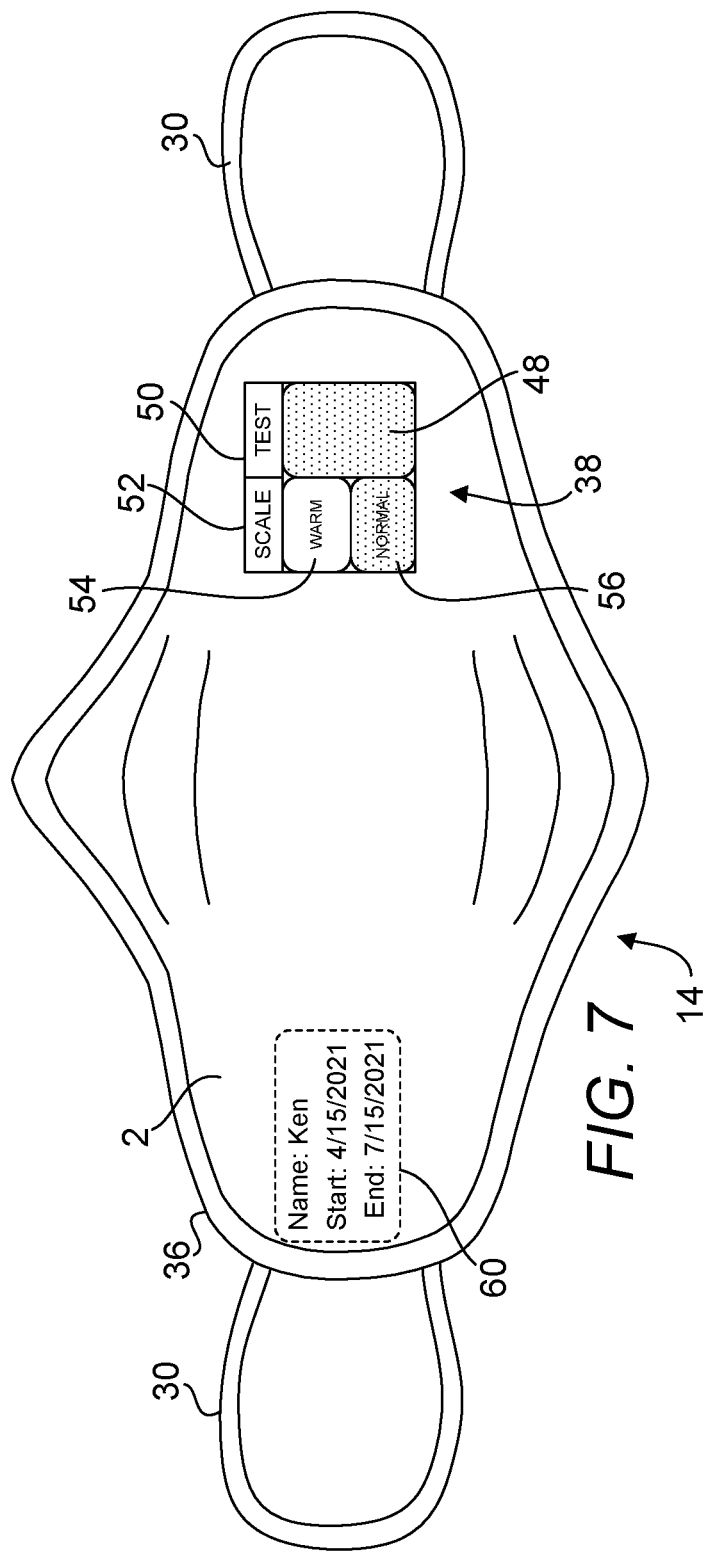
FIG. 7 is a front view of a present face mask including a multicomponent assemblage, depicting a thermochromic temperature scale configured for indicating the body temperature of a user in a normal range.
Figure 8:
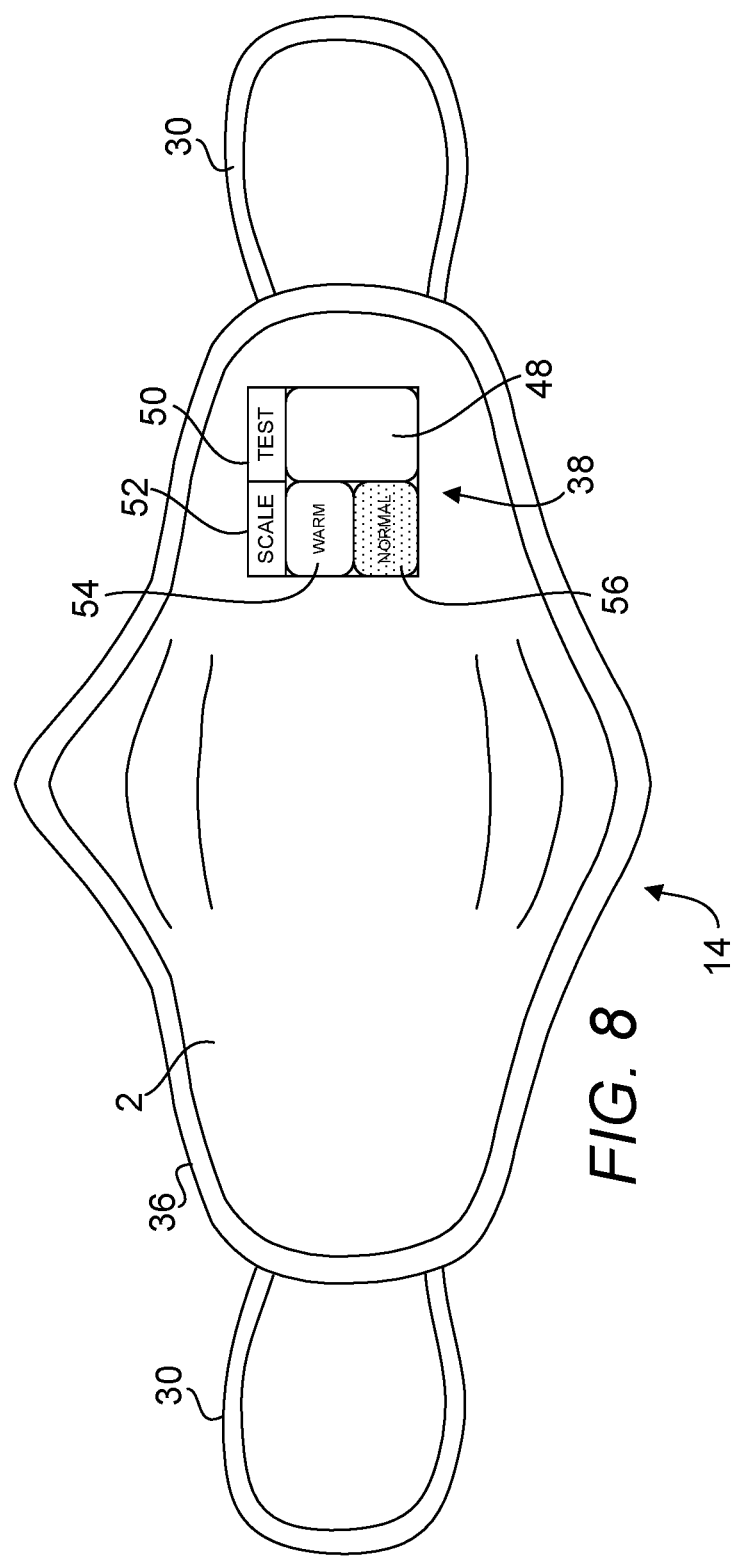
FIG. 8 is a front view of a present face mask including a multicomponent assemblage, depicting a thermochromic temperature scale configured for indicating the body temperature of a user in an abnormal range.

FIG. 7 is a front view of a present face mask including a multicomponent assemblage 2, depicting a thermochromic temperature scale configured for indicating the body temperature of a user in a normal range. Real time temperature monitoring and visualization among the mask wearer population provides an early detection or sentinel system to continually monitor in real time an individual's temperature state and provide an early warning of possible fever and infection while helping nearby individuals monitor the health state of their near neighbors. Here, the thermochromic temperature scale serves essentially as a temperature sensor. It includes two columns with one column 50 of which indicating the user's body temperature and the other one column 52 of which indicating a color 54, e.g., blue, etc., representing normal body temperature and a color 56, e.g., red, representing abnormal body temperature. The thermochromic material 48, e.g., thermochromic dye, disposed under column 50 is used to indicate whether the user is considered unwell or having a fever. As will be disclosed elsewhere herein, a temperature sensing element, e.g., a thermochromic dye, can be disposed in thermal connection with the user in various manners. In one example, the thermochromic dye can be thermally connected to one of the breathable layers, e.g., by a physical contact with one or more of the breathable layers containing metal, e.g., copper, copper alloy or silver. As these materials are metals which are excellent thermal conductors and a face mask 14 is disposed in close proximity or even contact with its user, the moisture and warmth from the user's exhalations can readily be transmitted to the breathable layers, causing the face mask 14 to reflect the user's temperature. As each of the copper, copper alloy or silver layers is highly thermally and electrically conductive, the elevated temperature of each layer substantially accelerates the rate of virus destruction and is particularly effective on cold days as any surface exposed to a cold environment can lose heat quickly and experience a rapid temperature drop. The strategy of using more than one layer applies not only to the face mask shown in FIG. 7 but also other embodiments of the face mask or filters disclosed elsewhere herein. For purpose of illustration, FIG. 7 discloses a state of the thermochromic dye that reflects a normal body temperature as the color of the thermochromic dye matches the color representing a normal body temperature. FIG. 8 is a front view of a present face mask including a multicomponent assemblage, depicting a thermochromic temperature scale configured for indicating the body temperature of a user in an abnormal range. Here, the thermochromic dye is disposed in a color reflecting an abnormal body temperature as the color of the thermochromic dye matches the color representing an abnormal body temperature, e.g., a body temperature indicating the user is having a fever. As such, a nearby individual can quickly detect, at a glance, whether a wearer of the face mask 14 is unwell such that the wearer can be duly notified of his or her condition. The assemblage is suitable for extended and continuous use, is capable of being personalized with the wearer's name, a date of first use and an intended date of final use in an identifying area or tag 60, and is cleanable by an exposure to the ultraviolet (UV) light, can be swabbed with an isopropyl alcohol wipe, or can be gently washed with soap and water. In one embodiment, the identifying tag 60 is a copper-containing organic material, e.g., copper phthalocyanine whose composition is also antiviral and antimicrobial and as such is not impeding virus destruction since it is a copper-containing marking ink. A face mask constructed from this assemblage can be worn overnight to provide improved allergen-free sleep.

Figure 9:
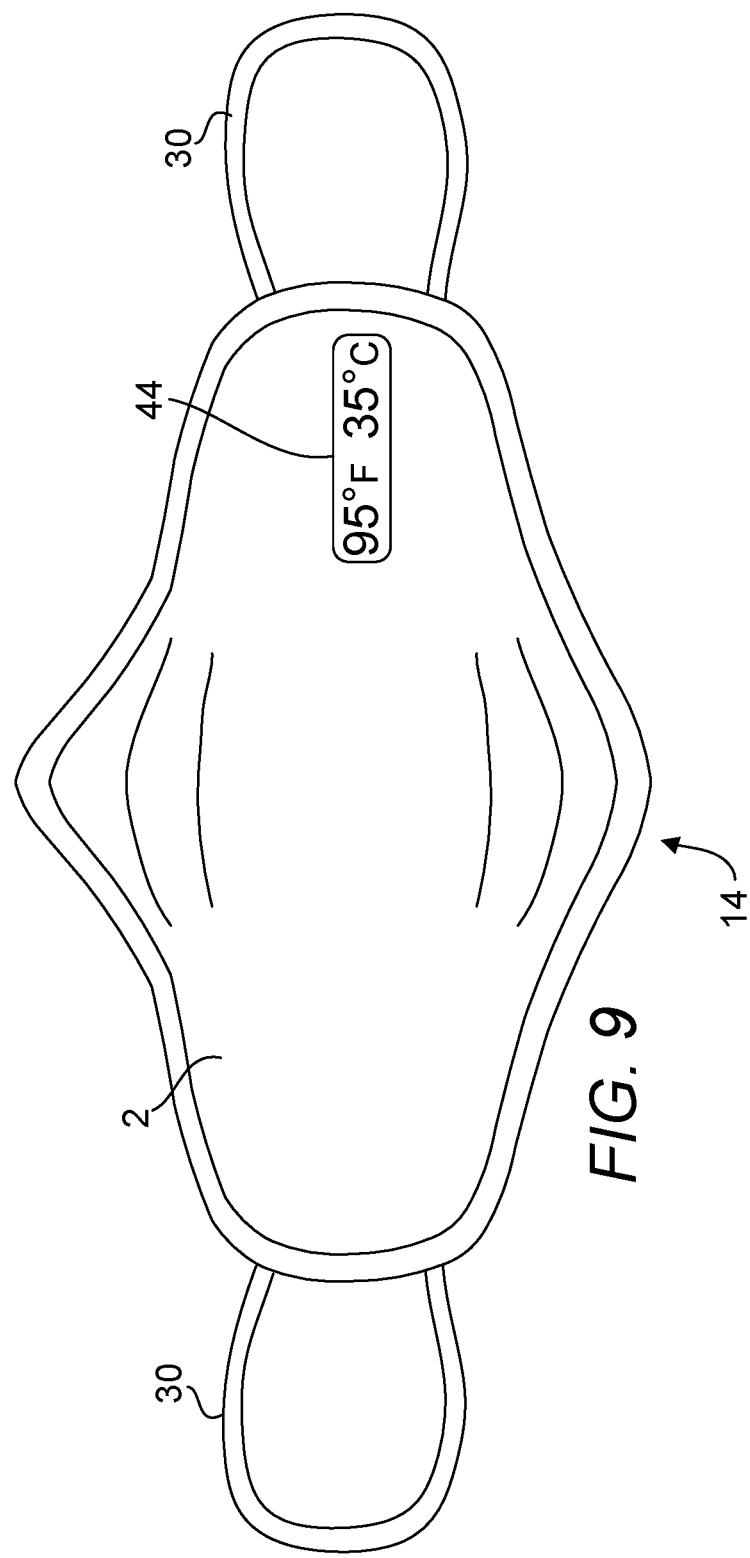
FIG. 9 is a front view of a present face mask including a multicomponent assemblage, depicting a digital temperature scale configured for indicating the body temperature of a user.

FIG. 9 is a front view of a present face mask including a multicomponent assemblage, depicting a digital temperature scale configured for indicating the body temperature of a user. Here, a wellness state may also be indicated with a color with a temperature sensor 38. However, the colors that indicate different wellness states may be displayed on an output screen which receives a user's temperature information from a control device functionally connected to the output device 44 screen and a temperature sensing element which senses a relevant temperature to the user. In one embodiment, the user's body temperature is calculated based on the temperature detected at the sensing element which may be thermally connected to one or more of the metallic layers and displayed on the output device 44 in both the Fahrenheit scale and the Celsius scale. A nearby individual is again capable of detecting whether a user of the face mask is unwell.

Figure 10:
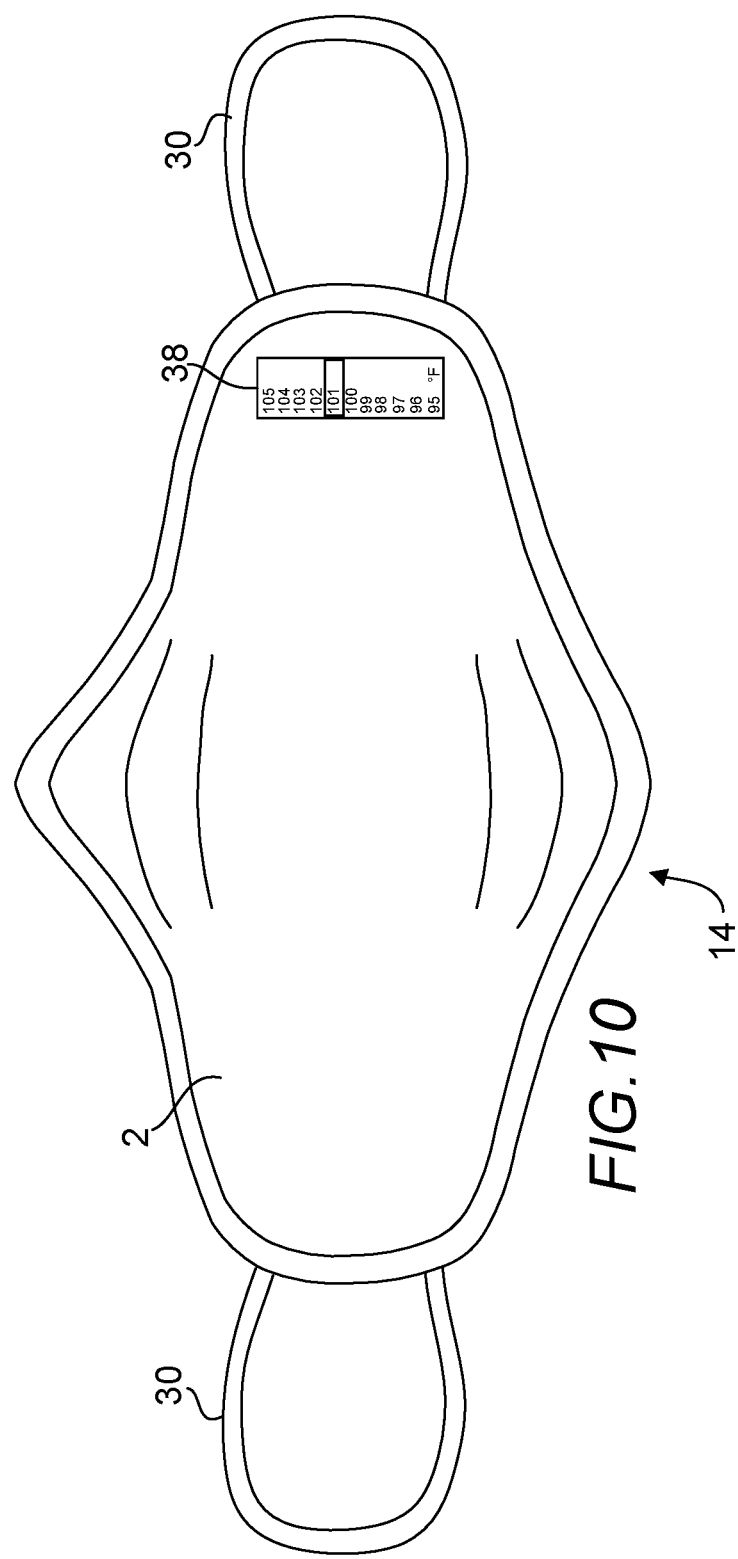
FIG. 10 is a front view of a present face mask including a multicomponent assemblage, depicting a temperature scale configured for indicating the body temperature of a user.

FIG. 10 is a front view of a present face mask including a multicomponent assemblage 2, depicting a temperature sensor 38 that is a temperature scale, e.g., Omega reversible Liquid Crystal Temperature Label RLC-80-50-150-10 or Cole-Palmer Digi-Sense Reversible 16-Point Vertical Temperature Label, 32-49C/90-120F, etc., configured for indicating the body temperature of a user. Here, instead of a temperature reading as shown in FIG. 9, the temperature scale indicates a temperature in a temperature range.

Figure 11:
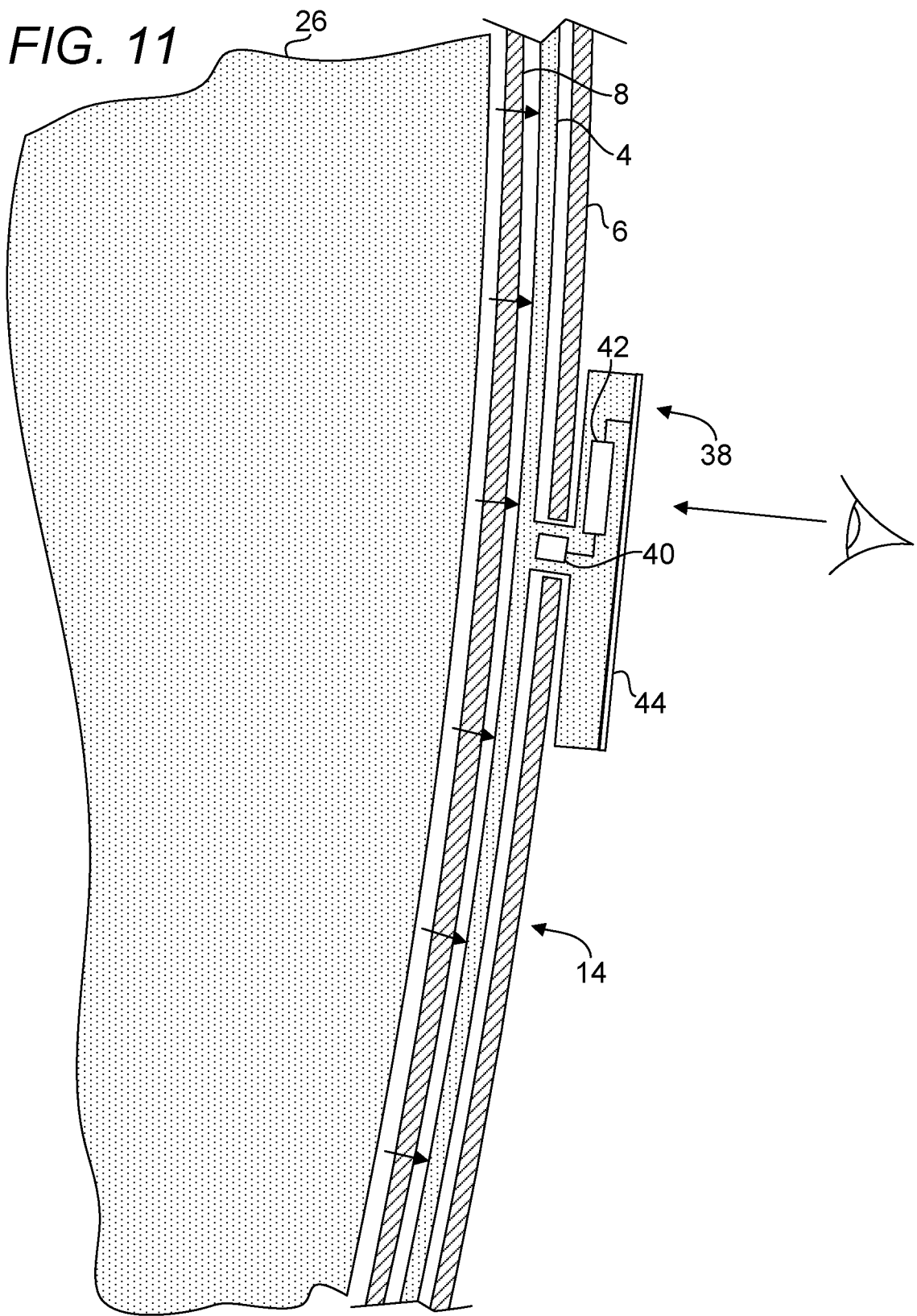
FIG. 11 is a cross-sectional view of one embodiment of a present face mask including a temperature sensor incorporated therein to reflect the body temperature of a user of the present face mask.

FIG. 11 is a cross-sectional view of one embodiment of a present face mask including a temperature sensor incorporated therein to reflect the body temperature of a user 26 of the present face mask 14. Here, a temperature sensor 38 is provided and coupled with the face mask 14. The temperature sensor 38 includes a sensing element 40, an output display 44 and a control device 42 functionally connected to both the sensing element 40 and the output display 44. In this embodiment, the sensing element 40 is thermally connected to the first breathable layer 4. In one embodiment, the sensing element 40 is a thermistor. In one embodiment, the output display is a Liquid Crystal Display (LCD). In one embodiment, the output display is a Light Emitting Diode (LED) display. In one embodiment, the output display is a reflective display. In one embodiment, the output display is a light absorptive display. In one embodiment, the output display is a thermochromic polymer responsive and representative of the range of at least about 97 to about 102 degrees F. A reading of exceeding 101.4 degrees F. may indicate that the mask wearer has a fever. In one embodiment, a communication module is further provided. The communication module is functionally connected to the control device 42 and the control device 42 is configured to broadcast via a communication protocol, e.g., Bluetooth or WiFi, an alert including, e.g., information indicating that the user may be unwell as the detected temperature is outside of a pre-determined normal range and the user's body temperature, etc.

Figure 12:
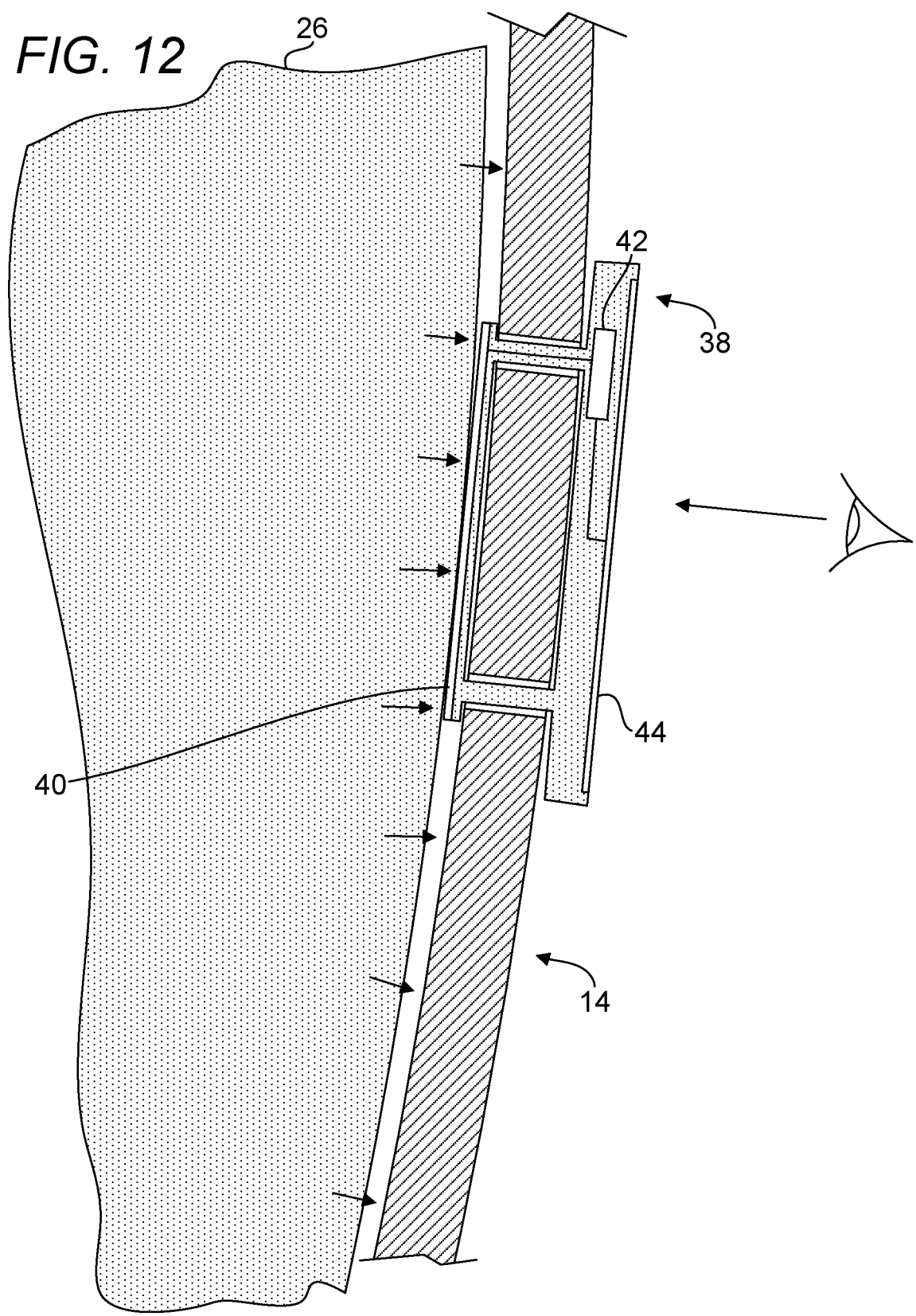
FIG. 12 is a cross-sectional view of another embodiment of a present face mask including a temperature sensor incorporated therein to reflect the body temperature of a user of the present face mask.

FIG. 12 is a cross-sectional view of another embodiment of a present face mask including a temperature sensor incorporated therein to reflect the body temperature of a user of the present face mask 14. Here, the various layers are represented as a single layer for simplicity. In this embodiment, a temperature sensor 38 is also provided. However, the sensing element 40 is extended to sense the user's body temperature by conduction through contact with the user 26.

Figure 13:
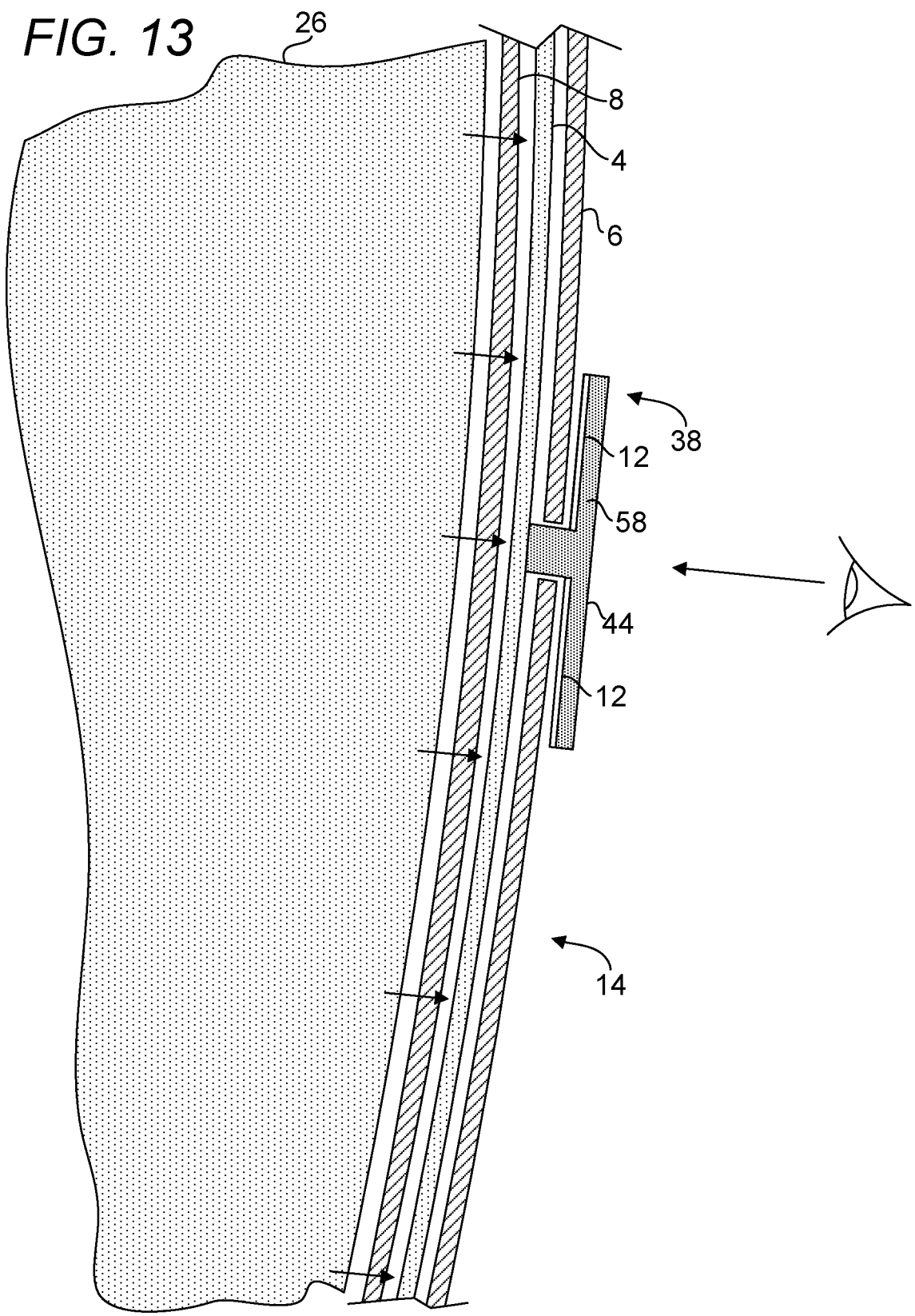
FIG. 13 is a cross-sectional view of yet another embodiment of a present face mask including a temperature sensor incorporated therein to reflect the body temperature of a user of the present face mask.

FIG. 13 is a cross-sectional view of yet another embodiment of a present face mask including a temperature sensor 38 incorporated therein to reflect the body temperature of a user of the present face mask 14. Here, a phase change material 58 is used to obscure a marking 12 that indicates that the user is unwell if the user 26 body temperature falls in a normal range. In this embodiment, the phase change material 58 is disposed in thermal contact with the first breathable layer 4. However, if the user 26 body temperature rises, the phase change material 58 is disposed in a clear and transparent state, revealing the marking 12 that indicates that the user 26 is unwell. A suitable marking can be the word "Sick."

Figure 14:
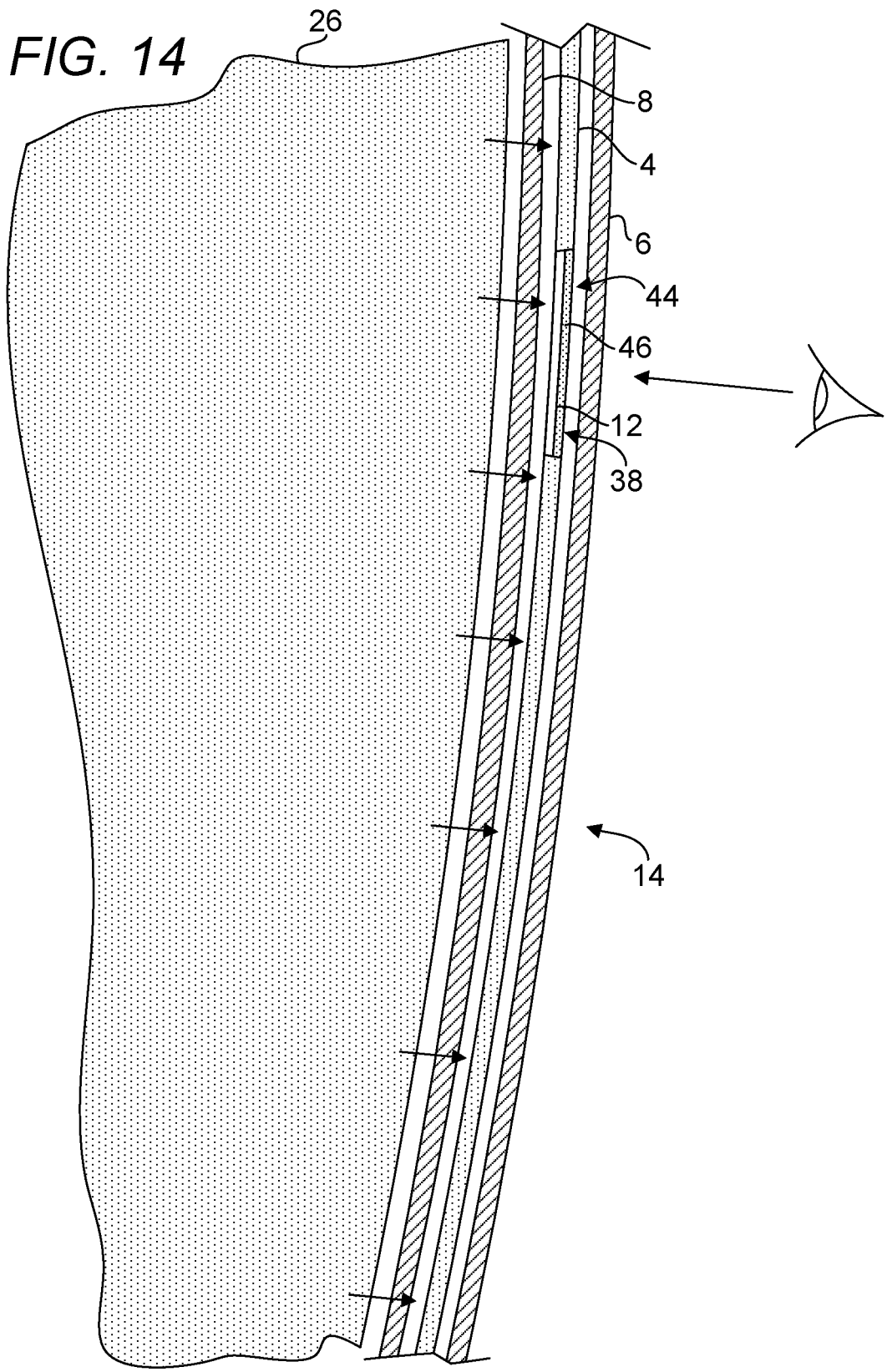
FIG. 14 is a cross-sectional view of yet another embodiment of a present face mask including a temperature sensor incorporated therein to reflect the body temperature of a user of the present face mask.

FIG. 14 is a cross-sectional view of yet another embodiment of a present face mask including a temperature sensor incorporated therein to reflect the body temperature of a user of the present face mask. In this embodiment, breathable layer 6 is a transparent antimicrobial layer that allows the underlying copper layer 4 and its temperature sensor to be observed and noted by a mask wearer passerby. The temperature sensor includes a phase change material 46 and is disposed between a viewer of the temperature sensor and the an indicator 12 configured to indicate that the user 26 is unwell, wherein if the phase change material 46 is disposed at a temperature exceeding about 99 degrees F., the phase change material is disposed in a transparent state, revealing a marking 12, e.g., with the word "Sick," indicating that the user 26 is unwell.

Figure 15:
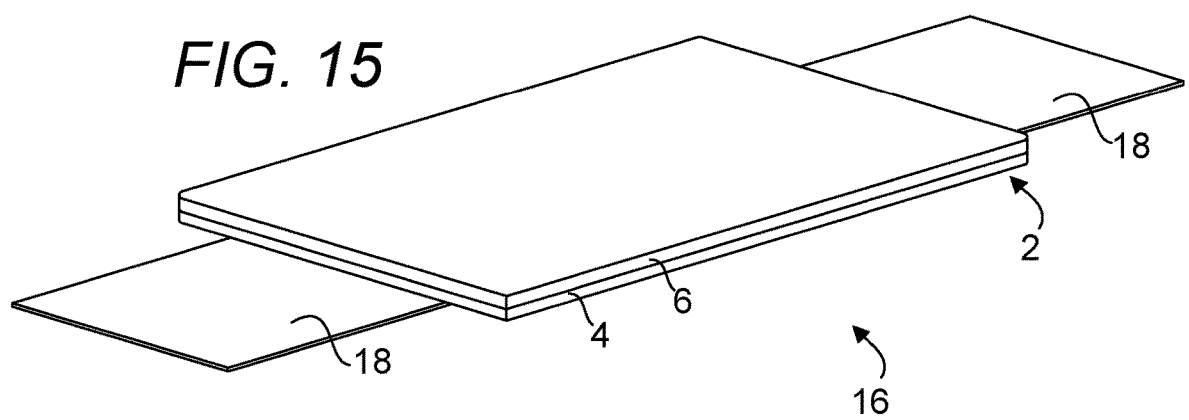
FIG. 15 depicts a bandage to which an embodiment of the present multicomponent or multilayer assemblage is applied.

The filter 2 disclosed elsewhere herein can be advantageously employed in other configurations such as a component of a portable ventilator system, a glove, a covering for an open wound and a respirator, etc. FIG. 15 depicts a bandage 16 to which an embodiment of the present multicomponent or multilayer assemblage is applied. Here, the portion of the bandage 16 useful for covering a wound is provided with a multilayer assemblage 2 while adhesives 18 are provided to facilitate securement of the bandage to a patient's skin. Conventional medical bandages used to cover open wounds contain anti-bacterial media in gel or pad form, etc. The use of an additional breathable layer including one or more copper-containing mesh screens adjacent to the layer closest to the wound to be treated would provide a protection against viruses and some bacteria that is unavailable in a conventional bandage.

Figure 16:
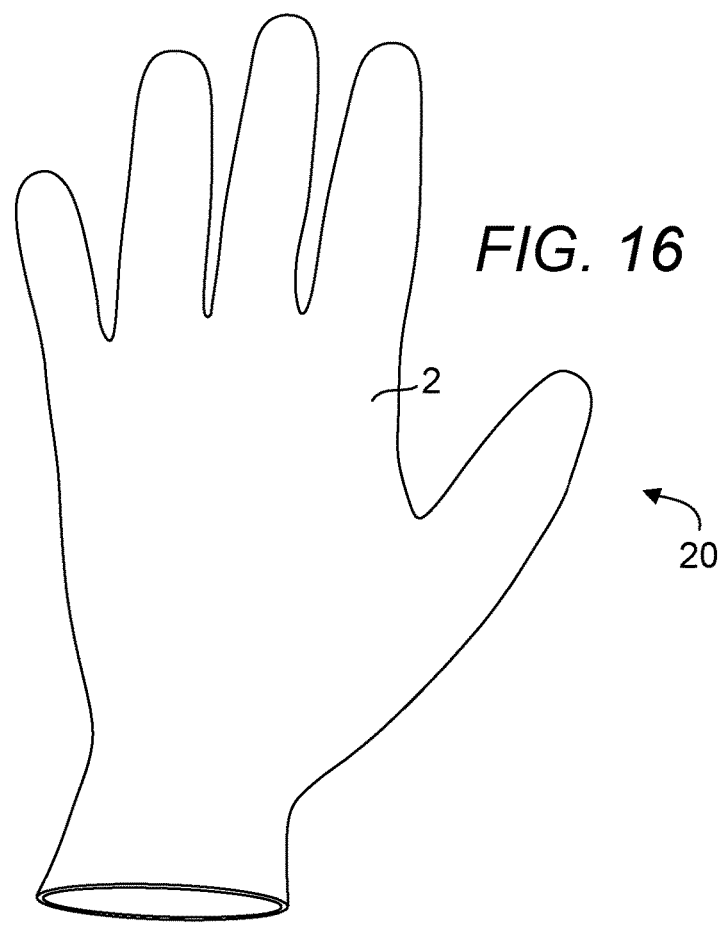
FIG. 16 depicts a glove to which an embodiment of the present multicomponent or multilayer assemblage is applied.

FIG. 16 depicts a glove 20 to which an embodiment of the present multicomponent or multilayer assemblage 2 is applied. Here, a multilayer assemblage 2 may be applied to the entire glove 20 or it may be selectively applied to various portions of the glove 20 that pathogens will most likely come in contact. The incorporated multilayer arrangement can be substantially simplified as only human contact protection need be provided. Thus, only one or more copper-containing layers enveloping the glove (subsurface) may be sufficient to provide contact protection against both bacteria and viruses. Alternatively, with a sufficiently low mesh size of less than about 200 or about 75 microns, the entire glove 20 itself may be made out of copper or one of its alloys while still allowing manual dexterity and flexibility.

Figure 17:
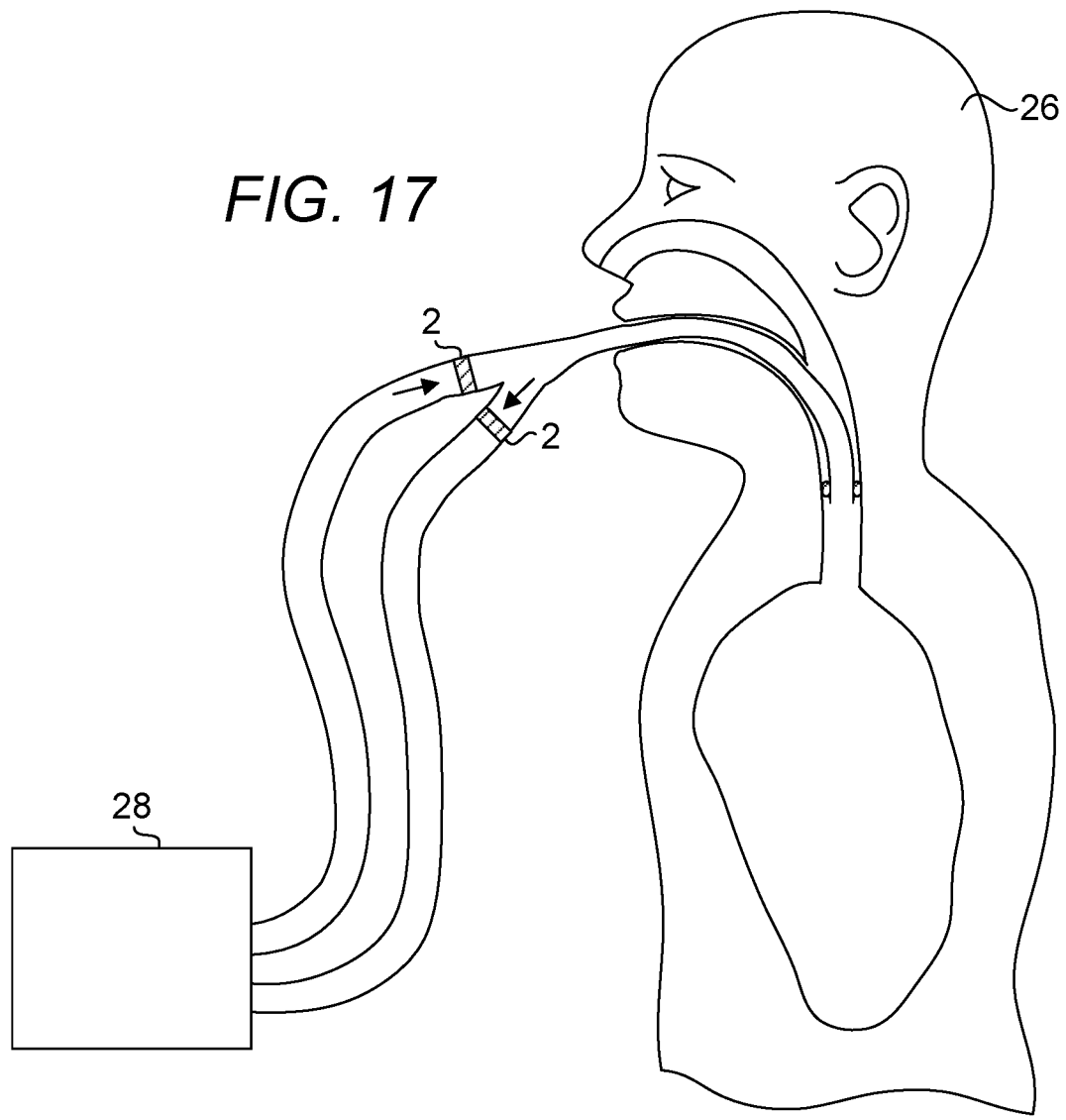
FIG. 17 depicts a medical ventilator to which an embodiment of the present multicomponent or multilayer assemblage is applied.

FIG. 17 depicts a medical ventilator 28 to which an embodiment of the present multicomponent or multilayer assemblage is applied. Here, a multilayer assemblage 2 may be applied to an inhalation tubing and an exhalation tubing as shown or a common endotracheal tube through which inhalation and exhalation both occur. A lightweight battery-operated, rechargeable, portable ventilator backpack that is easily carried, could be used to direct pathogen-contaminated air through a present filter. The filtered air is now safe to be used by the patient and the expelled air is now safe to be released from a pulmonary-compromised individual. The present filter 2 is suitable for capturing and destroying pathogens in a respirator. In one embodiment, the present filter 2 is also suitable for replacing conventional filter/s for a furnace or an air conditioning.

Experiments, e.g., Copper screen experiments, were conducted to ensure that a copper-imbibed layer, e.g., BMT VirusGuard NanoScreen™ PPE Filtration Fabric—Type 9004 Advanced Grade, is effective against a pathogen, e.g., Vesicular Stomatitis Virus (VSV). One set of experiments was conducted with a screen or layer that is not copper imbibed while the other set was. The following results were obtained:

Viral Filtration Efficiency average=99.9%
Bacterial Filtration Efficiency average=99.9%
Particle Filtration Efficiency average=97.8%
Delta-P/Tested with Delta-P Breathability of 8.38

| Summary (pathogen count/area) | | |
|---|---|---|
| Time (hr) | without copper treatment | with copper treatment |
| 1 | 9.13E+06 | 4.93E+04 |
| 4 | 8.90E+06 | 0.00E+00 |
| 6 | 3.82E+06 | 5.00E+00 |

The data in the above table shows that with the copper-imbibed layer or screen, after only one hour, only about 0.54% of VSV survived. After four or six hours, the virus is totally destroyed. The results for the layer or screen that is not copper-imbibed shows a much different outcome. After four hours, the majority of VSV lived and after six hours, the live VSV only decreased to about 42% of its original concentration.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A filter configured for capturing and killing pathogens to protect a user, said filter comprising:

a plurality of breathable layers comprising copper and silver, a first of said plurality of breathable layers consisting of said copper; and a second of said plurality of breathable layers consisting of said silver, said second of said plurality of breathable layers stackably coupled to said first of said plurality of breathable layers and a temperature sensor configured for obtaining and displaying a temperature of the user, said temperature sensor comprising a sensing element thermally connected to and integrally built with said copper of said first of said plurality of breathable layers and said sensing element is disposed in a thermally conductive relationship with respect to said first of said plurality of breathable layers, wherein, when said filter is disposed over the nose and the mouth of the user, at least a portion of the inhalation and exhalation through the nose or the mouth of the user flows through each of the respective copper and silver material of said first and second of said plurality of breathable layers, said first of said plurality of breathable layers and said second of said plurality of breathable layers cooperate to capture and kill pathogens mobilized through at least one of said first and said second of said plurality of breathable layers.

2. The filter of claim 1, wherein at least one of said first and second of said plurality of breathable layers comprises a matrix selected from the group consisting of a wire mesh, an expanded pad, a printed pad and an aerogel matrix.

3. The filter of claim 1, wherein the thickness of each said breathable layer is less than about 0.3 mm.

4. The filter of claim 1, wherein said filter is a filter configured for an equipment selected from the group consisting of a personalized protection equipment, a face mask, a glove, a scarf, a bandage for covering and protecting an open wound, a portable wearable ventilator system, a respirator, a furnace filter and an air conditioning filter.

5. The filter of claim 1, wherein at least one of said first and second of said plurality of breathable layers is a layer selected from the group consisting of a flat layer and a pleated layer.

6. A face mask for a user having a face, a nose and a mouth, said face mask comprising a filter comprising a plurality of breathable layers:

(i) a first of said plurality of breathable layers consisting of copper;

(ii) a second of said plurality of breathable layers consisting of silver, said second breathable layer stackably coupled to said first breathable layer;

(iii) a third of said plurality of breathable layers consisting of silver, wherein said third of said plurality of breathable layers is stackably coupled with said first and second of said plurality of breathable layers such that said first of said plurality of breathable layers is disposed between said second and third of said plurality of breathable layers; and (iv) a temperature sensor configured for obtaining and displaying a temperature of the user, said temperature sensor comprising a sensing element thermally connected to and integrally built with said copper of said first of said plurality of breathable layers and said sensing element is disposed in a thermally conductive relationship with respect to said first of said plurality of breathable layers, wherein said filter is configured to cover at least a portion of the nose of the user and at least a portion of the mouth of the user and wherein, when said filter is disposed over the nose and the mouth of the user, at least a portion of the inhalation and exhalation through the nose or the mouth of the user flows through each of the respective copper and silver material of said first, second, and third of said plurality of breathable layers and said first breathable, second, and third of said plurality of breathable layers cooperate to capture and kill pathogens mobilized through at least one of said first, second and third of said plurality of breathable layers due to said at least a portion of the inhalation and the exhalation.

7. The face mask of claim 6, wherein said filter further comprises a fourth of said plurality of breathable layers disposed between and coupled to said third and first of said plurality of breathable layers, wherein said fourth of said plurality of breathable layers comprises an anti-allergen polymer screen.

8. The face mask of claim 7, wherein said anti-allergen polymer screen comprises pore sizes greater than or equal to about 300 nm.

9. The face mask of claim 6, wherein said temperature sensor further comprises an output display.

10. The face mask of claim 9, wherein said output display is a display selected from the group consisting of a Liquid Crystal Display (LCD), a Light Emitting Diode (LED) display, a reflective display, a light absorptive display and any combinations thereof.

11. The face mask of claim 9, wherein said output display is a thermochromic polymer responsive and representative of the range of at least about 97 to about 102 degrees F.

12. The face mask of claim 6, wherein said temperature sensor comprises a phase change material, wherein if said phase change material is disposed at a temperature indicating the user is unwell, said phase change material is disposed in a transparent state, revealing an indicator indicating that the user is unwell.

13. The face mask of claim 6, wherein said first of said plurality of breathable layers comprises a matrix material comprising a copper alloy.

14. The face mask of claim 6, further comprising at least one identifying label comprising an item selected from the group consisting of a name tag, a date of first use, an intended date of final use and any combinations thereof.

15. The face mask of claim 14, wherein said at least one identifying label is marked using copper phthalocyanine.

16. The face mask of claim 6, wherein said second of said plurality of breathable layers comprises a material selected from the group consisting of a silver antimicrobial salt, a silver sewn threaded matrix, a silver printed matrix and any combinations thereof.

* * * * *